United States Patent
Zehr

[11] 3,863,662
[45] Feb. 4, 1975

[54] FUSIBLE LATCH FOR HOLDING OPEN A SELF-CLOSING VISCOUS LIQUID DRUM VALVE

[75] Inventor: William J. Zehr, Des Plaines, Ill.

[73] Assignee: The Protectoseal Company, Bensenville, Ill.

[22] Filed: Dec. 13, 1973

[21] Appl. No.: 424,468

[52] U.S. Cl. .................. 137/75, 137/377, 251/300
[51] Int. Cl. ........................................... F16k 17/40
[58] Field of Search .................. 137/72, 75, 76, 77; 251/300

[56] References Cited
UNITED STATES PATENTS
2,867,228   1/1959   Rike et al. ................. 137/75 X
3,378,021   4/1968   Milo ............................. 137/75
3,758,070   9/1973   Zehr ............................. 251/86

Primary Examiner—Martin P. Schwadron
Assistant Examiner—Richard Gerard
Attorney, Agent, or Firm—Wm. A. Snow; Chas. W. Rummler

[57] ABSTRACT

A fusible latch for holding open a guillotine-type, self-closing drum valve having a cylindrically arcuate valve shoe and seat which are centered on an axis passing through the discharge passage of the valve and which are eccentrically actuated to self close from a full-floating open position and which exert maximum sealing pressure between said shoe and seat in the closing position thereof. A snap-on wire guard in the discharge passage of the valve prevents the operator's injury from an inadvertent insertion of his fingers therein.

3 Claims, 6 Drawing Figures

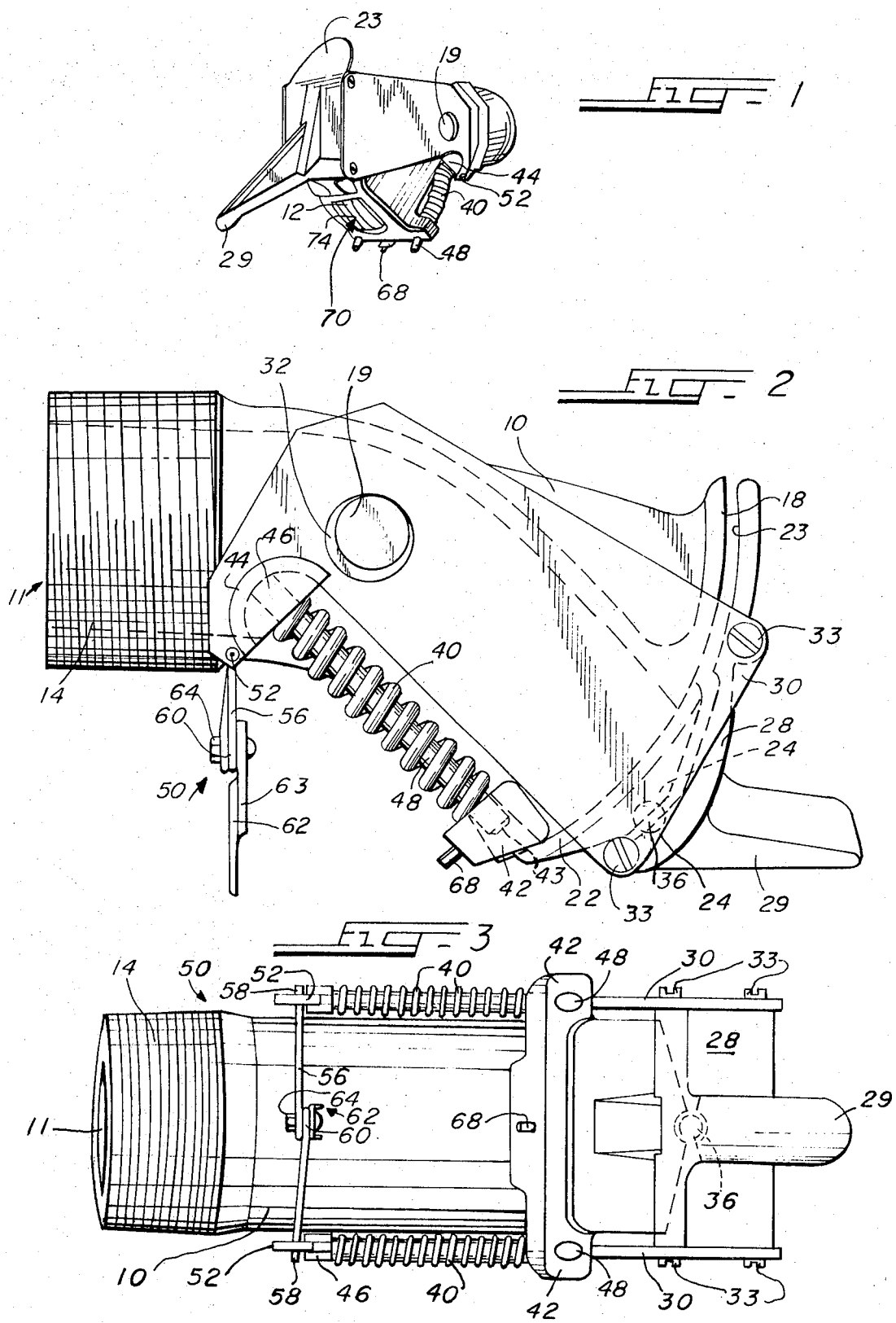

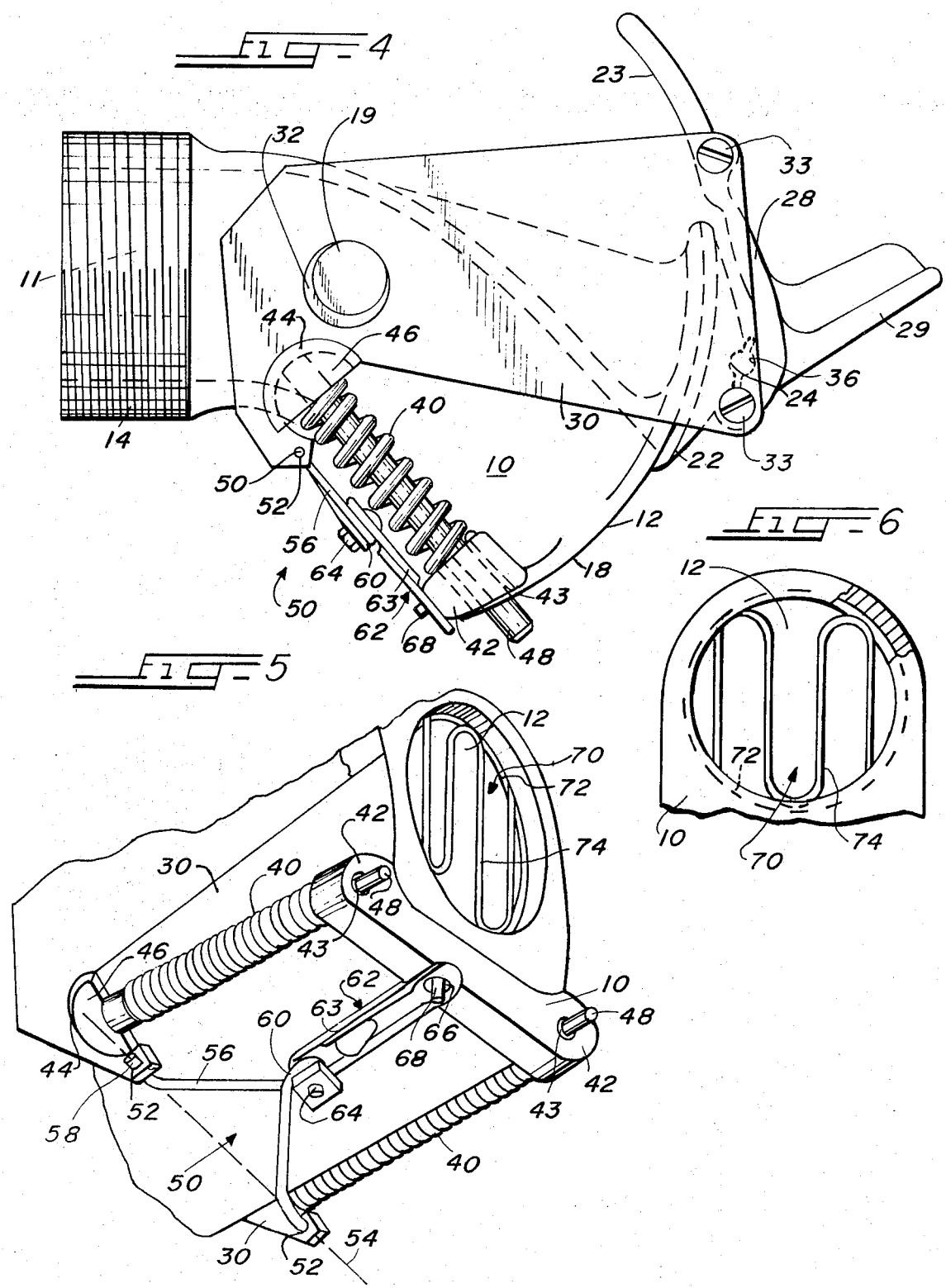

3,863,662

FUSIBLE LATCH FOR HOLDING OPEN A SELF-CLOSING VISCOUS LIQUID DRUM VALVE

BACKGROUND OF THE INVENTION

This invention relates to a self-closing, guillotine-type, heavy viscous liquids shutoff valve for use with paint, heavy oils, rubber cement, and the like. Guillotine-type shutoff valves such as that disclosed in my U.S. Pat. No. 3,758,070 having a substantially circular discharge orifice terminating in an arcuate seat surface on the valve body to which is applied an arcuate valve plate adapted to slidingly gate the orifice in the shut off of the flow of viscous liquids therefrom have been in common use for many years. The valve plate is moved from an orifice covering position to an open position by a valve-operating lever or handle which is pivoted on the valve body on an axis coincident with the radius of the arcuate seat surface. Guillotine-type shutoff valves also carry an element of risk of injury to the operator who inadvertently inserts his fingers in the discharge passage and accidentally lets go of the shut-off mechanism.

In the prior art, it has been the practice to hold the self-closing, guillotine-type valve open manually during the dispensation of combustible viscous materials such as paint, rubber cement, heavy oils, etc. Self closing of a manually held open valve automatically supplies protection in case of fire during pouring of these liquids therefrom.

If the valve is held in the open position by a latch and the drum goes unattended during pouring, this presents a fire hazard.

There is thus an established need for a fusible latch for holding open a self-closing, guillotine-type drum valve, for fire protection, and a discharge passage protective device so that the operator cannot inadvertently insert his fingers therein to his injury.

SUMMARY OF THE INVENTION

The gist of this invention comprises a fusible mechanical latch for holding open a guillotine-type, self-closing drum valve having a valve body with a cylindrically-arcuate valve seat, which arc is centered on an axis passing through a discharge passage in the valve body and upon which seat a cylindrical arcuate valve shoe is constrained to slide by arms which are pivotally mounted thereto astride the discharge passage thereof. Each of said arms supports a compression spring which is mounted in parallel but offset relation to the axis of the discharge passage of the valve acting on the respective arm and reacting on the body of the valve in such a manner that said springs self close the valve. One end of each of said springs is appropriately mounted to swivel in its respective arm. A halter having a fusible link in its length is mounted to the arms in offset relation to the pivot thereon. The link engages a boss which is mounted on the body of the valve to latch the valve in the open position.

A formed wire mesh snaps in an internal groove in the discharge passage of the valve to prevent the operator's insertion of his fingers therein.

BRIEF DESCRIPTION OF THE DRAWINGS

FIG. 1 is a perspective view of the self-closing, viscous liquid drum valve;

FIG. 2 is a side view of the valve in the closed position;

FIG. 3 is a bottom view of the valve in the closed position;

FIG. 4 is a side view of the valve latched in the open position; and

FIG. 5 is a fragmented perspective view of the latch.

FIG. 6 is a fragmented end view partly in section of the valve discharge orifice.

DETAILED DESCRIPTION OF THE DRAWINGS

The viscous liquid, self-closing shutoff valve of this invention comprises a valve body 10 having an elbowed bore 11, as shown in FIGS. 2 and 4, with a substantially circular discharge passage 12 in fluid connection with said bore 11 at one end thereof and a threaded pipe fitting 14 in fluid connection with the bore 11 at the opposite end thereof. Trunnion bosses or pins 19 are cast in the outer sides of the body 10 diametrically opposite each other at a location which is substantially intermediate between the pipe fitting end 14 and the discharge passage end 12, as shown in FIGS. 2 and 4. The bosses 19 are on a common trunnion axis and extend sidewardly therefrom, as shown in FIGS. 1, 2 and 4.

A convex, cylindrically-arcuate valve seat 18, which terminates the end surface of discharge orifice 12, as shown in FIGS. 4 and 5, is cylindrically shaped about the axis of the circular trunnion pins 19, as shown in FIGS. 1 and 2. A valve shoe 22, having a concave arcuate sealing face 23 of the same radius of curvature as the arcuate valve seat 18 is slidingly applied to the arcuate seat 18, as shown in FIGS. 2 and 4, to gate the orifice 12 in the shut off and opening of the valve. A ball socket 24 is located in the back face of the valve shoe 22, as shown in broken lines in FIGS. 2, 3 and 4, and a steel ball 36 seats in the socket 24 therein.

A valve-operating lever structure 28, having spaced, parallel side arms or plates 30, is anchored as at 33 as by machine screws at the forward corners thereof to the sides of lever-supporting structure 28, as clearly shown in FIGS. 2, 3, 4, and contains bores 32 therein each loosely pivoted on the trunnion pins 19, as shown in FIGS. 2 and 4. Bores 32 are only loosely pivoted on the trunnion pins 19 for the purpose of allowing free, self-aligned seating of the valve plate 22 on the valve seat 18 with the maximum effective sealing thereon when the valve is closed making wear pads unnecessary because the large-clearance bore 32 shown provides freedom of action, accommodation of manufacturing tolerances and take-up for valve plate 22 wear on valve seat 18.

The self-closing and sealing mechanism of the valve of this invention, as shown in FIGS. 1, 2, 3, 4 and 5, comprises coil springs 40 the axes of which are oriented in parallel relation with respect to the axis of the discharge passage 12 in a location outside the body 10 and offset in the direction of the closing of the valve thereto. Fixed spring-end seating lugs 42 having clearance bores 43 with axes substantially parallel to the axis of the discharge passage are mounted to the body 10 adjacent to and outside of the discharge orifice 12 on the respective lines of action of the springs 40. The opposite ends of said springs 40 seat against respective spring shoes 46.

Spring shoe seats 44 of semi-circular form are cut in each side arm or plate 30, as shown in FIGS. 2, 4 and 5.

Spring shoes 46 pivotally seat in respective shoe seats 44, as shown in FIGS. 2 and 4. Slide rods 48, which are coaxial with and on the line of action of the axis of each spring 40, are fixedly mounted at one end to the respective shoes 46, and are loosely slidable at the other end through respective bores 43 in the lugs 42 on the valve body 10, as shown in FIGS. 2, 3, 4 and 5. The slide rods 48 serve to guide springs 40 and to maintain square end seating of spring 40 on the shoes 46 at all times.

Pivot bores 52 in each of side arms 30 located on the side of the center of seats 44 opposite to trunnions 19 have a common swivel axis 54 which is parallel to the axis of trunnions 20 through the center of the discharge passage 12.

The fusible link structure 50 comprises a stiff wire halter 56 having pivot ends 58 each of which engages one of the pivot bores 52 and medially its ends loops around to form an eye 60 which is centrally disposed between pivot ends 58 and extends outwardly from the body 10 of the valve. A link 62 comprising two pieces of metal which are fused together to form a single piece at joint 63 is bored at one end to take nut and screw combination 64 for engaging eye 60. The other end of link 62 is provided with an aperture 66.

A pin 68 is mounted on the body 10 of the valve midway between the seating lugs 42 of the springs 40 and extends outwardly therefrom.

In latching the valve in the open position, the aperture 66 engages the pin 68 and retains the springs 40 in the compressed condition so that self closing of the valve is rendered impossible.

Referring to FIGS. 5 and 6, the finger guard 70 comprises convolutions 74 of folded-back tempered spring steel wire assembled in the groove 72 in the discharge passage 12 adjacent to the outlet therefrom by compression thereof to fit within the inside diameter of the discharge passage 12 and the snapping of the expanded convolutions 74 into the groove 72.

Although but one specific embodiment of this inventon is herein shown and described, it will be understood that details of the construction shown may be altered or omitted without departing from the spirit of the invention as defined by the following claims.

I claim:

1. A guillotine-type, self-closing drum valve having a body with a cylindrically-arcuate seat and sliding shoe supported on side arms centered on a trunnion axis passing through the discharge passage of the valve, which shoe is eccentrically actuated to close by compression springs acting on the side arms adjacent to the trunnion, and reacting against the body of the valve adjacent to the outlet of the discharge passage, and which shoe is normally loaded by said compression springs to pressure seal the shoe against the seat in the closed position wherein the improvement comprises:

a. a halter pivotally mounted on one end in each side arm outside the point of action of the compression springs from the trunnion axis on the side arm, and extending outside the body of the valve;

b. a fusible link fixedly connected to the halter at the other end and having an aperture at its free end; and c. a pin fixedly mounted in the valve body adjacent the lower end of the outlet of the discharge passage for seating of the aperture of the fusible link thereon to hold the valve open against bias of the spring.

2. A guillotine-type drum valve having a valve body including an elbowed bore with a substantially circular discharge passage in fluid connection with said bore at one end thereof and a threaded pipe fitting in fluid connection with the bore at the opposite end thereof, trunnion bosses mounted in the outer sides of the body diametrically oposite each other at a location substantially intermediate between the pipe fitting end and the discharge passage end, said trunnion bosses mounted on a common trunnion axis and extending outwardly therefrom, a convex cylindrically-arcuate valve seat terminating the surface of the discharge passage end and centered about the axis of the trunnion pins, a valve shoe having a concave arcuate sealing face of the same radius of curvature as the arcuate seal slidingly applied thereon, a ball socket located in the back face of the valve shoe and in the back face of the seat and a steel ball seating in the socket therein; a valve-operating lever structure having spaced parallel side arms anchored at the forward corners thereof containing bores therein each loosely pivoted on the trunnion bosses, coil springs the axes of which are oriented in parallel relation with respect to the axis of the discharge passage located outside the body and offset in the direction for closing of the valve thereto, fixed spring seating lugs having clearance bores therein with axes substantially parallel to the axis of the discharge passage mounted to the body adjacent to and outside of the discharge passage end on the respective lines of action of the springs, opposite ends of said springs seating against respective spring shoes, spring shoe seats of semi-circular form cut in each side arm, spring shoes pivotally seating in respective shoe seats, slide rods coaxial with and on the line of action of the axis of each spring fixedly mounting at one end to the respective shoes and loosely sliding at the other end through respective bores in the lugs on the valve body, the slide rods serving as guides for the springs and maintaining square end seating thereof on the shoes, the improvement comprising a halter pivotally mounted on one end in each side arm outside the point of action of the compression springs from the trunnion axis on the side arm and extending outside the body of the valve, a fusible link fixedly connected to the halter at the other end and having an aperture at its free end, and a pin fixedly mounted in the valve body adjacent the lower end of the outlet of the discharge passage, for seating of the aperture of the fusible link thereon to hold the valve open against bias of the springs.

3. The device of claim 2 wherein the inner surface adjacent the discharge end of said valve is provided with a groove supporting a guard therein to prevent inserting of the fingers of the operator into said opening.

* * * * *